United States Patent [19]

Dunning

[11] Patent Number: 4,492,505
[45] Date of Patent: Jan. 8, 1985

[54] CLAMPING DEVICE FOR USE ON HAND TRUCK

[76] Inventor: Donald T. Dunning, 224 W. Boeing Dr., Midwest City, Okla. 73110

[21] Appl. No.: 343,043

[22] Filed: Jan. 27, 1982

[51] Int. Cl.³ .............................................. B62B 1/06
[52] U.S. Cl. ......................................... 414/454; 414/456
[58] Field of Search ................. 414/456, 622; 294/92, 294/11; 403/166, 373, 3, 4, 381; 410/51, 143, 151, 153

[56] References Cited

U.S. PATENT DOCUMENTS

| | | |
|---|---|---|
| 303,657 | 8/1884 | Metzger et al. |
| 593,226 | 11/1897 | MacPhail |
| 1,194,342 | 8/1916 | De Lore |
| 1,316,239 | 9/1919 | Hogander |
| 1,517,951 | 12/1924 | Cade |
| 1,971,952 | 8/1934 | Townsend |
| 2,346,649 | 4/1944 | Bilek et al. |
| 2,541,613 | 2/1951 | Roe |
| 3,251,495 | 5/1966 | Paton |
| 3,741,413 | 6/1973 | Friel |
| 4,252,357 | 2/1981 | Majors ................... 294/11 |
| 4,354,795 | 10/1982 | Dutra ................... 414/622 |

*Primary Examiner*—Robert G. Sheridan

[57] ABSTRACT

A clamping device for securing a load on a hand truck is attached to either outer side tube of the truck. The clamping device can be moved vertically on a guide rod which is attached to the outer side tube when the operator has actuated a release lever. After an extension bar, having a variety of possible shapes is positioned on the load, the operator presses the clamping device down on the load and removes the actuating force on the release lever. This locks the clamping device in place and secures the load on the truck. A set of floating clamps allows minimum load shifting and locks the clamping device on the guide rod when so desired by the operator.

5 Claims, 4 Drawing Figures

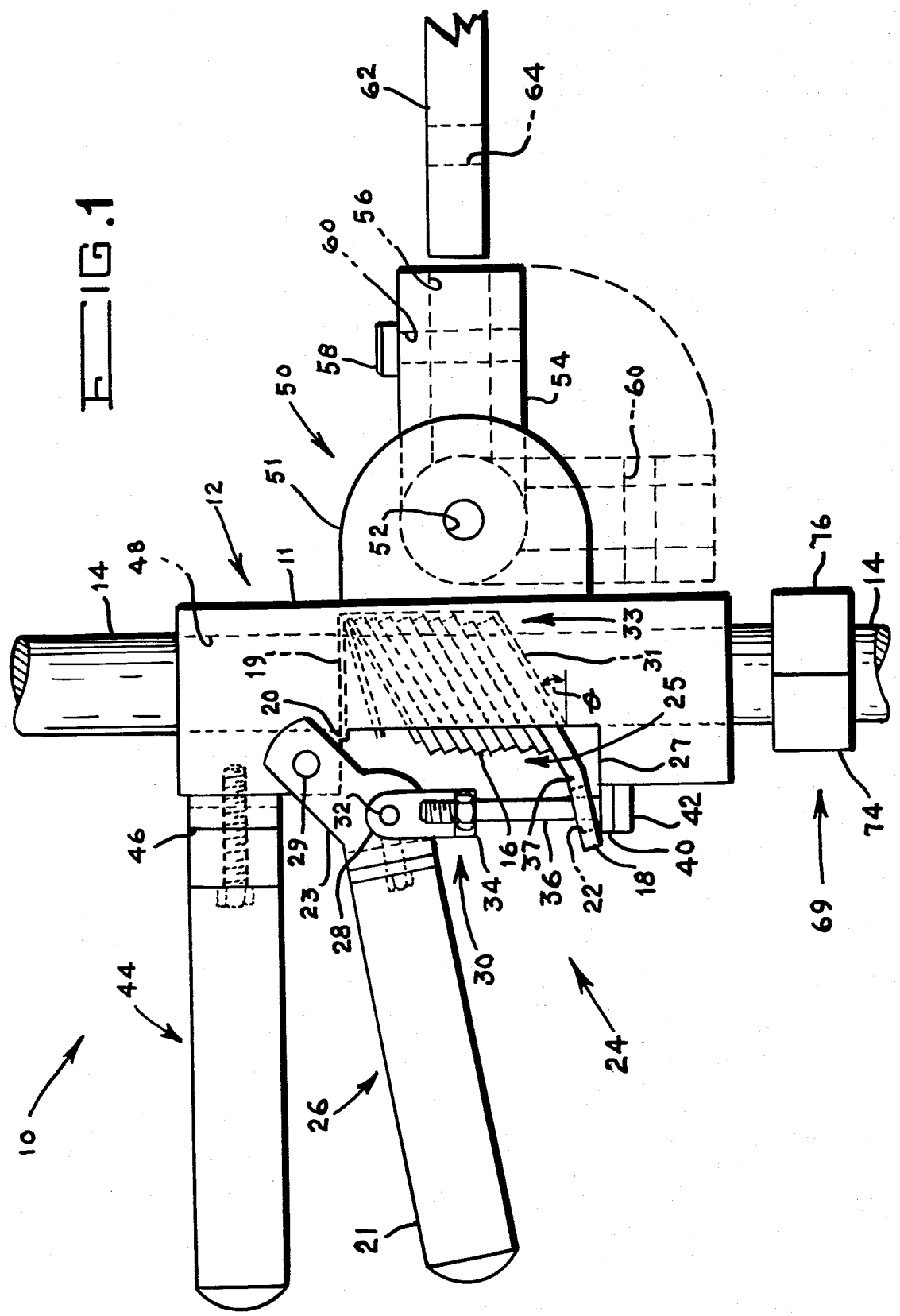

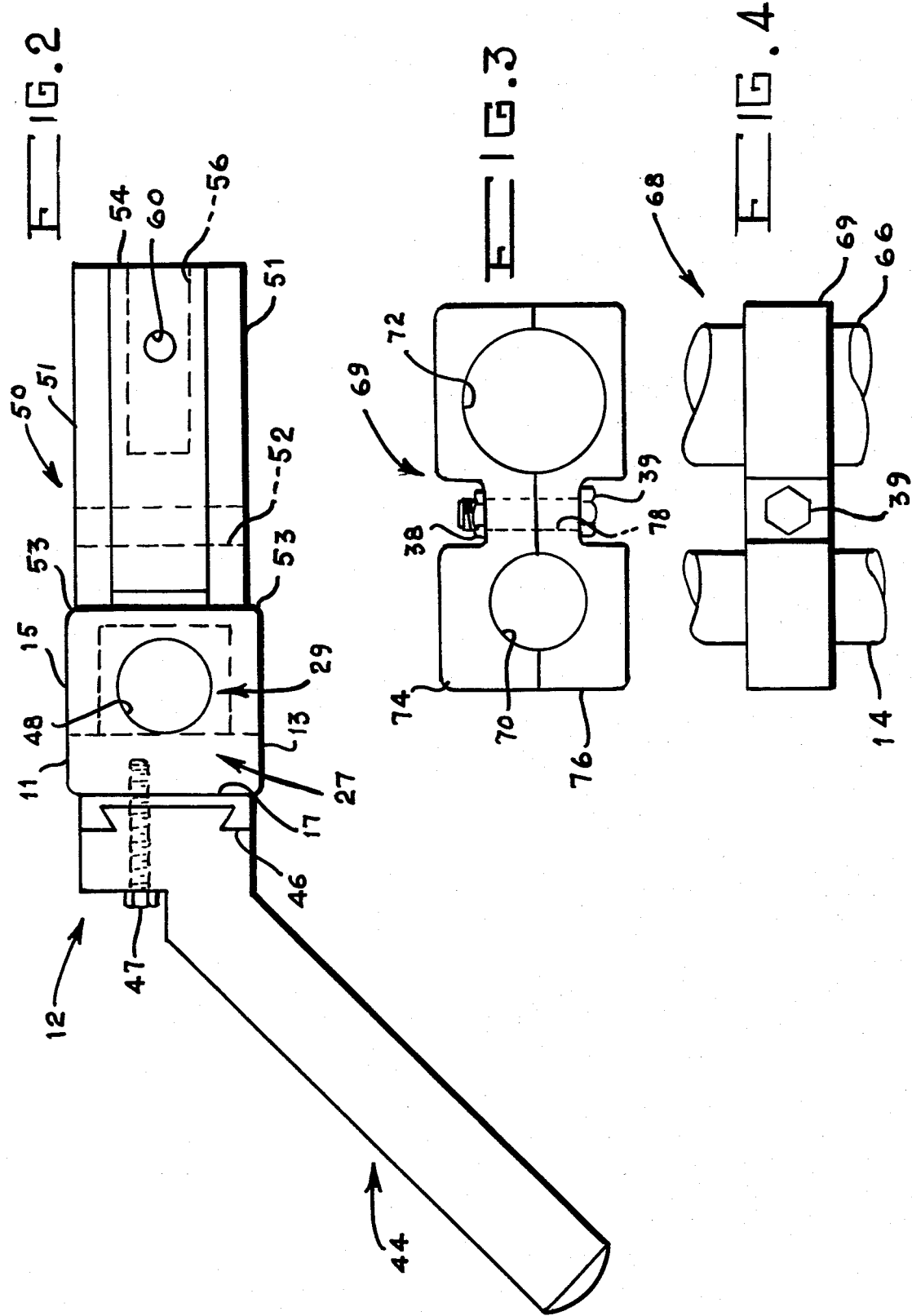

CLAMPING DEVICE FOR USE ON HAND TRUCK

STATEMENT OF GOVERNMENT INTEREST

The invention described herein may be manufactured and used by or for the Government for governmental purposes without the payment of any royalty thereon.

BACKGROUND OF THE INVENTION

This invention relates generally to hand trucks, and more particularly, to clamping devices used on the hand trucks for securing loads thereon.

The problem of securing a load on a hand truck is well known in the art and has been addressed by many inventive devices. For example, the upper part of the load is usually secured by a belt, a bail, a hook or a claw, for example, and the lower part of the load is held by a load bearing platform. The upper load securing device is usually designed to fit a uniquely shaped load such as a barrel, a crate, etc. The load platform has also been designed for uniquely shaped loads. Although most of these devices have served the purpose for which designed, there exists a need for a universal load securing device that can be attached to hand trucks of standard design.

One particular device of wide use is the belt. This device is usually attached to the middle of the hand truck. One end of the belt is wrapped around a spring actuated drum so that an appropriate amount of the belt can be withdrawn to go around the load on the hand truck. The loose end of the belt is inserted in a pickup so that tension can be applied in the belt to securely hold the load to the back of the truck. Obviously, this device has many advantages but it is time consuming to pull the belt around the load and tighten it too. It is also time consuming to release the load quickly. This is true when many articles are to be moved. Further, a stacked load may not be properly held in place by the belt device because the belt will only secure items directly in contact with the belt. The belt device fails to exert force down on a load, only laterally.

Another device is a clamp. The clamp is placed on the top of the load. The problem with past clamping devices has been that they are designed to secure loads of unique shapes, and are usually an integral part of the hand truck operation.

Thus the need exists for a clamping device that exerts a downward force to secure the load, is easily operated by one man, is quickly applied and removed, and can be attached to standard trucks without extensive modifications.

SUMMARY OF THE INVENTION

The instant invention sets forth a clamping device for securing a load on a hand truck and thereby overcomes the problems set forth hereinabove.

The clamping device of this invention is fixedly attached to a vertical outer tube on either side of a conventional hand truck. The tube can be cylindrical or rectangular in shape, for example. The clamping device includes a lower and upper bracket which are attached to the vertical outer tube of the hand truck; a guide rod that is secured to the brackets so as to be parallel to the vertical outer tube; a clamp body through which the guide rod passes, the clamp body having a handle attached thereon; a locking and a releasing assembly operably connected to the guide rod and the clamp body for locking the clamp body on the guide rod where so desired and for applying pressure to the load; and a clamp extension connected to the clamp body which holds an extension arm that presses downwardly upon the load when so positioned by the operator.

The locking and releasing assembly includes a release lever which pivots on the clamp body, a connecting arm with one end pivoting on the release lever so that when the release lever is raised, the connecting arm is raised, and a plurality of clamps, one clamp having one end attached to the other end of the connecting arm. The clamps are wrapped around the guide rod and held in place by the clamp body. When the release lever is raised, the connecting arm raises one end of the clamps. The clamps release their grip on the guide rod so that the clamp body can be moved on the guide rod. Releasing the release lever causes the clamps to grip the guide rod and lock the clamp body in place.

In operation, the operator places the load on the hand truck and the operator then raises the release lever which causes the clamps to release their grip on the guide rod so that the operator can move the clamping device along the guide rod and position the extension arm on the top of the load. After the extension arm is placed on the top of the load, the operator releases the release lever whereupon the clamps lock the clamping device on the guide rod. To release the clamping device, the operator follows the reverse of the above procedure.

It is therefore an object of this invention to provide a clamping device which can be attached to a conventional hand truck.

It is a further object of this invention to provide a clamping device that is adjustable for loads of different types.

It is still another object of this invention to provide a clamping device adjustable for loads of different shapes.

It is a still further object of this invention to provide a clamping device which can be quickly applied and released.

These and many other objects and advantages of the present invention will be readily apparent to one skilled in the art to which the invention pertains from a perusal of the claims and of the following detailed description of a preferred embodiment of the invention when read in conjunction with the drawings.

BRIEF DESCRIPTION OF THE DRAWING

FIG. 1 is a side view of the clamping device of this invention;

FIG. 2 is a plan view of the clamping device of this invention;

FIG. 3 is a plan view of the bracket used for attaching the clamping device to the guide rod and the outer tube of the hand truck; and FIG. 4 is a side view of the bracket attached to the outer tube of the hand truck and the guide rod.

DETAILED DESCRIPTION OF THE PREFERRED EMBODIMENT

Reference is made to FIG. 1 of the drawing which discloses a side view of a clamping device 10 of this invention for use in securing a load on a hand truck. Clamping device 10 illustrated attaches to a vertical outer tube 66 shown in FIG. 4, on either side of a conventional hand truck (not shown). Outer tube 66 can be either cylindrical or rectangular shaped, but preferably cylindrical as herein shown. Because of its unique construction, clamping device 10 need be operated by only one man. If further features a locking and releasing assembly to rapidly secure loads and an extension bar adaptable for securing a variety of different shaped loads.

Clamping device 10 is constructed basically of a mounting assembly 68 (shown in FIG. 4) for mounting clamping device 10 to the hand truck, a control body 12 attached to mounting assembly 68, a locking and releasing assembly 24 for positioning control body 12 on mounting assembly 68, and a contacting assembly 50 for securing the load in response to movement of control body 12 on mounting assembly 68.

In greater detail, referring specifically to FIGS. 3 and 4, mounting assembly 68 includes an upper and lower bracket 69 (only one shown since they are similar in detail) and a guide rod 14. Also shown is preferred outer tube 66 of the hand truck. Outer tube 66 can be mounted on any load carrying surface, not just a hand truck. Although cylindrical tubing is shown, nothing prevents a bracket from holding a rectangular or other uniquely shaped tube. Bracket 69 has a first and second sides 74 and 76. These sides 74 and 76 can be constructed of a sufficiently strong material such as aluminum or steel. Sides 74 and 76 are secured to each other by suitable securing devices such as a nut 38 and a bolt 39 through coincident holes 78 in sides 74 and 76. First and second mounting holes 70 and 72 are formed in side 74 and 76 so that guide rod 14 and outer tube 66 are securely held by upper and lower brackets 69 when sides 74 and 76 are secured together. Guide rod 14 is parallel to outer tube 66 and extends perpendicularly from the side of the hand truck.

Referring to FIGS. 1 and 2, control body 12 is attached to guide rod 14. The same reference numerals will be used in all the Figures to identify identical elements. Control body 12 includes a housing 11 and a stationary handle 44 attached to housing 11. As shown in FIG. 2, handle 44 is joined to housing 11 by a dovetail joint 46 and a bolt 47. Handle 44 is constructed of a sufficiently strong material such as aluminum or steel. Dovetail joint 46 allows handle 44 to be reversed for either left or right side attachment of clamping device 10 to the hand truck.

The side view and top view of housing 11 is shown in FIGS. 1 and 2 respectively. Housing 11 is constructed of a conventional material such as aluminum. Housing 11 is rectangular shaped having a guide rod hole 48 running vertically from top to bottom of housing 11. Guide rod 14 fits closely within guide rod hole 48 so that there is little horizontal movement of housing 11 when housing 11 reciprocates on guide rod 14. A recess 25 is formed in housing 11 to allow the insertion of clamps 16 and a spring 20 about guide rod 14 when clamping device 10 is assembled and to hold clamps 16 and spring 20. Recess 25 has a first section 27 shaped in the form of a rectangular void, and a second section 19 adjacent to first section 27. First section 27 has three imaginary sides coincident with housing 11 sides 13, 15, and 17, shown in FIG. 2. Second section 19 is formed in housing 11 as a truncated rectangular void having no sides coincident with housing 11 and only one side coincident with first section 27. Second section 19 is formed so that a seat 31 is formed in housing 11 on which a master release clamp 18 rests in a locked state. Guide rod hole 48 traverses second section 29 in the vertical direction.

Referring to FIG. 1, locking and releasing assembly 24 includes a release lever 26, a connecting rod assembly 30, and a locking assembly 33. Release lever 26 has a handle 21 and a pivot base 23. Handle 21 is similar to handle 44 of control body 12 with respect to shape, construction, and connecting joint to pivot base 23. Pivot base 23 has a first pivot 29 that rotatably connects base 23 to housing 11. When an operator of the hand truck squeezes handles 44 and 21 together, base 23 rotates in the direction of handle 44. A second pivot 32 of base 23 attaches to connecting rod assembly 30.

Connecting rod assembly 30 has one end rotatably secured to pivot base 23 and the other end connected to master release clamp 18. In greater detail, a sleeve 28 is pinned at one end to pivot base 23 by pivot 32 and at the other end is threaded to receive an adjusting rod 36. A locking nut 34 secures adjusting rod 36 to sleeve 28 after adjustment. The other end of adjusting rod 36 has a cylindrical head 42. Adjusting rod 36 passes through a rod guide hole 22 of master clamp 18. A washer 40 is placed between master clamp 18 and head 42 so that there is little play between washer 40 and master clamp 18 when clamping device 10 is locked on guide rod 14. Because master clamp 18 is not fixedly secured to adjusting rod assembly 30, master clamp 18 can float within housing 11 to a limited degree when clamping device 10 is applied to the load or the load shifts.

Locking assembly 33 for locking housing 11 to guide rod 14 includes a plurality of clamps 16 and spring 20. Each clamp 16 can be a rectangular plate with an elliptical hole therein. The minor axis of the elipse is slightly greater than the outer diameter of guide rod 14. Further, when clamps 16 are resting on seat 31 which is inclined at a angle $\theta$ from the horizontal, the elliptical holes of clamps 16 when viewed from above or below appear as a circle. The length of the major axis of the elipse is determined by the inclination of seat 31. Also, the edges of the elliptical holes would operably engage guide rod 14 to prevent the movement of guide rod 14 within housing 11. Spring 20 is placed about guide rod 14 between housing 11 and clamps 16 in a compressed state so that clamps 16 are always being forced by spring 20 to seat 31. In order to release the clamping action on guide rod 14, release lever 24 is raised. This lifts master release clamp 18 which only differs from other clamps 16 by an arm 37 having adjusting rod guide hole 22 therein.

In order for clamping device 10 to secure the load, contacting assembly 50, FIGS. 1 and 2, is fixedly attached to housing 11. Further, contact assembly 50 includes extension brackets 51 and extension housing 54, and an extension bar 62. Referring to FIG. 2, two extension brackets 51 are shown attached by conventional means to housing 11 at joints 53. Extension housing 54 is at one end secured between brackets 51 by means of a pin placed in pivot hole 52 which passes through brackets 51 and extension housing 54. This allows extension housing 54 to be rotated in the vertical plane as shown in FIG. 1 by the ghost lines. At the other end of extension housing 54, an extension bar recess 56 is formed therein. A retaining pin 58 can be placed through recess 56 by insertion in a retaining pin hole 60. Pin 58 locks extension bar 62 in recess 56. Extension bar 62 has a pin hole 64 through which pin 58 passes. Extension bar 62 has one end shaped to fit in recess 56 and the other end shaped to secure the load. The particular shape of the securing end can be selected based on the load shape. For example, the securing end could be shaped as a bail to secure a barrel, a hook, a claw, a rubber footed clamp, etc.

In operation, a load is placed upon the conventional load bearing platform of the hand truck. Clamping device 10 is not limited in use to hand trucks, but can be used on any load carrying surface. Assuming that the operator has selected the proper extension bar 62 and it is inserted in extension housing 54, the operator raises extension housing 54 to the horizontal position. Thereafter, the operator squeezes together release handle 21 and handle 44 which releases the locking force of clamps 16 upon guide rod 14. The operator then can move housing 11 in the vertical direction either up or down so that extension bar 62 is above the load. At this point, the operator rotates clamping device 10 on guide rod 14 so that extension bar 62 is placed over the load and thereafter pushes extension bar 62 into the load. At this point, the operator then releases handle 21 which causes clamps 16 to lock on guide rod 14 so that housing 12 is locked on guide rod 14 and the load is now secured on the load bearing platform of the hand truck and held in place by the clamping device 10 of this invention. To release the load, the reverse procedure is followed.

Thus, the above description taken together with the following claims constitute a disclosure such as to enable a person skilled in the mechanical arts having the benefit of the teachings herein to make and use the invention described herein. Further, the invention described herein constitutes an unobvious advance to such a person not having the benefit of this disclosure.

What is claimed is:

1. A clamping device for securing a load on a load carrying surface comprising:

means for mounting said clamping device to a side of said load carrying surface, said means for mounting including a plurality of brackets and a guide rod, said brackets fixedly secured to a side tube on said load carrying surface and said guide rod being essentially parallel with said side tube, said brackets being fixedly attached to the ends of said guide rod, a control body attached to said mounting means for reciprocal movement thereon as required by the shape of said load, said control body including a housing and a handle, said handle attached to said housing, said housing having said guide rod passing therethrough and being a rectangular solid box having a guide rod hole therein and a recess therein having an inclined seat, means for locking and releasing said control body, said locking and releasing means attached to said control body and said mounting means, said means for locking and releasing including a release lever, a connecting rod assembly, a plurality of clamps, and a spring, said release lever pivoting on said housing so that said operator is able to squeeze said handle of said control body and the handle of said release lever together with one hand, said connecting rod at one end pivoting on said release lever, the other end of said connecting rod attached to a master release clamp, said master release clamp being adjacent to said inclined seat of said housing, said plurality of clamps having said guide rod therethrough and having elliptical holes therein for said guide rod, when said release lever is not actuated, said clamps lock on said guide rod, said spring having said guide rod therethrough and said spring positioned between said housing and said plurality of clamps, said spring biasing said clamps against said inclined seat, and means for contacting said load to secure said load on said load carrying surface, said contacting means attached to said control body so that when an operator actuates said locking and releasing means, said control body can be moved on said mounting means such that said contacting means operably secures the load when the operator ceases actuation of said locking and releasing means.

2. A clamping device as defined in claim 1 wherein said handle is attached to said housing by a dovetail joint and a bolt such that said handle is reversible in position on said housing.

3. A clamping device as defined in claim 2 wherein said release lever comprises said release lever handle and a pivot base, said release lever handle attached to said pivot base by a dovetail joint and bolt so that said release lever handle can be reversed in position on said pivot base.

4. A clamping device as defined in claim 3 wherein said connecting rod comprises a sleeve and an adjusting rod, said sleeve pivoted at one end to said release lever and threaded at the other end to said adjusting rod, said adjusting rod attached to said sleeve and at the other end by a rod head to an arm of said master release clamp.

5. A clamping device as defined in claim 4 wherein said plurality of clamps comprises one master release clamp having said arm for attachment to said connecting rod, and a plurality of clamp plates, said plurality of clamp plates stacked on top of said master release clamp and being of sufficient number whereby said plates in combination with said spring lock said clamping device on said guide rod until released.

* * * * *